July 6, 1937.   J. M. CHEVALIER   2,086,293
ANTIBLINDING GOGGLES AND ANALOGOUS SCREENS
Filed July 24, 1936   2 Sheets-Sheet 1

J. M. Chevalier
INVENTOR

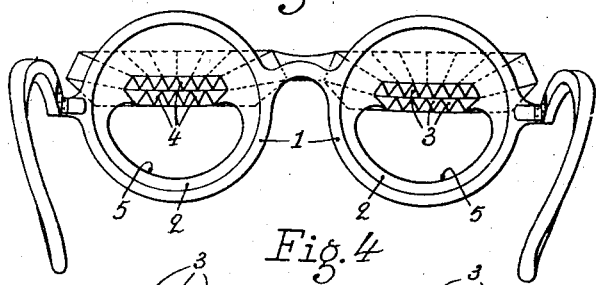
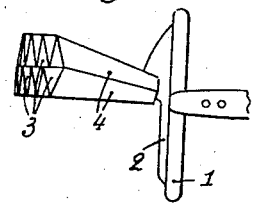
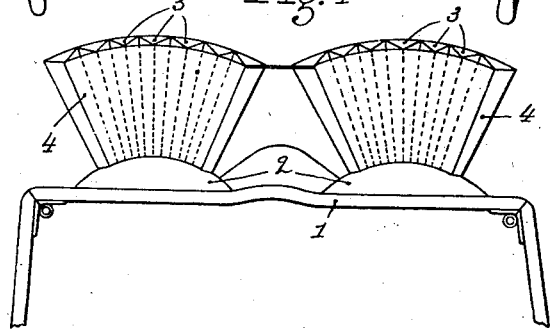
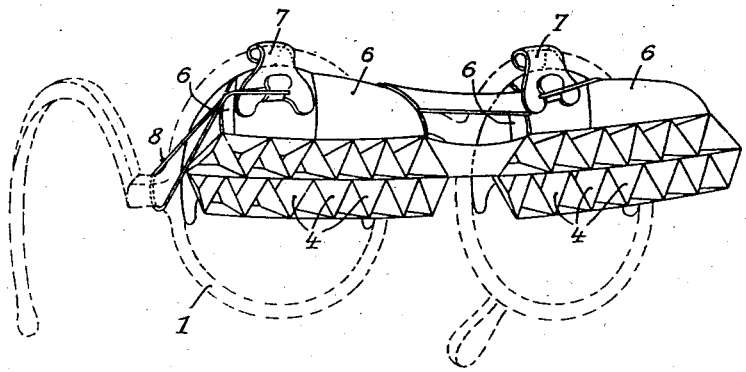
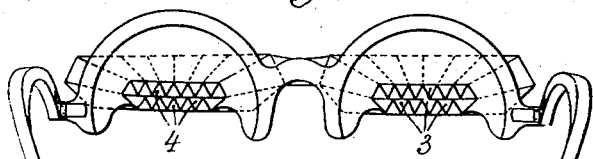

Patented July 6, 1937

2,086,293

UNITED STATES PATENT OFFICE 2,086,293

ANTIBLINDING GOGGLES AND ANALOGOUS SCREENS

Jules Marcel Chevalier, Commentry, France

Application July 24, 1936, Serial No. 92,453
In France August 19, 1935

3 Claims. (Cl. 2—12)

The present invention relates to goggles or screens which are adapted to be placed before the eyes of an observer, in such manner that while maintaining the clear sight of images, the major part of the disagreeable and troublesome effect of the blinding rays of light will be eliminated, even in the most unfavourable cases, i. e. when these rays are only slightly inclined from the direction of vision, or even if they coincide with this direction.

The said goggles (or screens) are chiefly characterized by the fact that they comprise, for each eye of the observer, a group of cells having the form of truncated pyramids of elongated shape and placed in contact after the manner of the cells of a honeycomb, being open at both ends and having walls of small thickness which are opaque, the virtual apexes of all the cells coinciding, approximately, with the centre of vision of the corresponding eye of the observer.

The cross-section of each cell is thus of small size adjacent the eye, and then increases when proceeding from the eye.

The aggregate of the two groups of cells for the two eyes is mounted on a support which may have the form of a usual goggle frame, or a different form whose only function is that of a support for holding the cells.

For an observer having abnormal eyesight which requires the use of optical glasses, the groups of cells may be removable in order that they may be mounted on an existing frame carrying the corrective glasses.

The arrangement of the groups of protecting cells may vary according to their use.

The cone of vision which is covered by the eye without any movement of the head, may be occupied for the major part by the convergent cells.

For localized positions of blinding the region of the cells may be limited to this blinding region, and the adjacent regions may be left free, thus leaving the vision disengaged, without the interposition of any parts of the device.

The region of vision may further comprise:

A first transparent part which is strongly coloured and entirely stops the blinding rays while permitting an attenuated vision of the illuminant, which a rapidly acquired habit permits of maintaining in this protecting region.

A second part, provided with protecting cells which serve chiefly for the region in which the sight requires to be complete and at the same time to be protected against momentary blinding effects.

Lastly, a third part which is left free and provides for the vision of a region in which the blinding rays do not occur, or only exceptionally.

The various arrangements above-mentioned are not limitative; they are only indicative for the combinations of groups of cells which in addition to their efficacity, may be constructed in order to comply with various tastes, with an attractive appearance of the device adopted, etc.

Further characteristics will be set forth in the following description.

In the accompanying drawings, which are given solely by way of example:

Figs. 3, 4 and 5 are respectively an elevational view, a plan view and a side view of a device with goggle frame of the usual commercial type.

Fig. 6 is an elevational view of a device in accordance with the invention, but in this case with a goggle frame which is limited to its upper part.

Fig. 7 is a perspective view of a modification.

Figure 1:
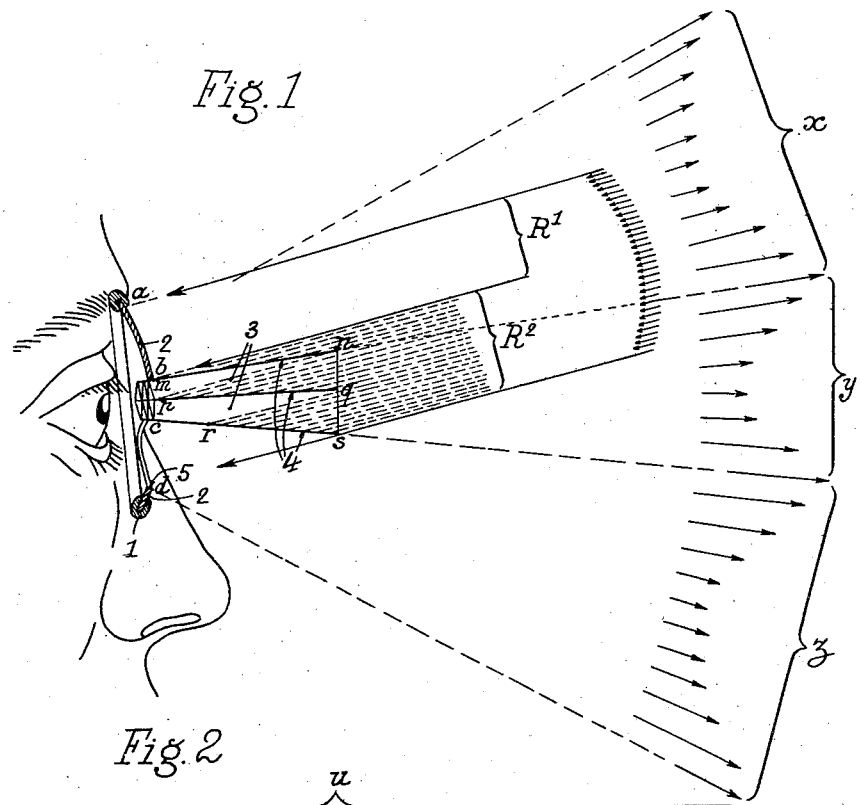
Fig. 1 is a diagrammatic vertical section showing the operating principle of the protecting device in accordance with the invention, and the various regions of vision which are obtained by the said device.
Figure 2:
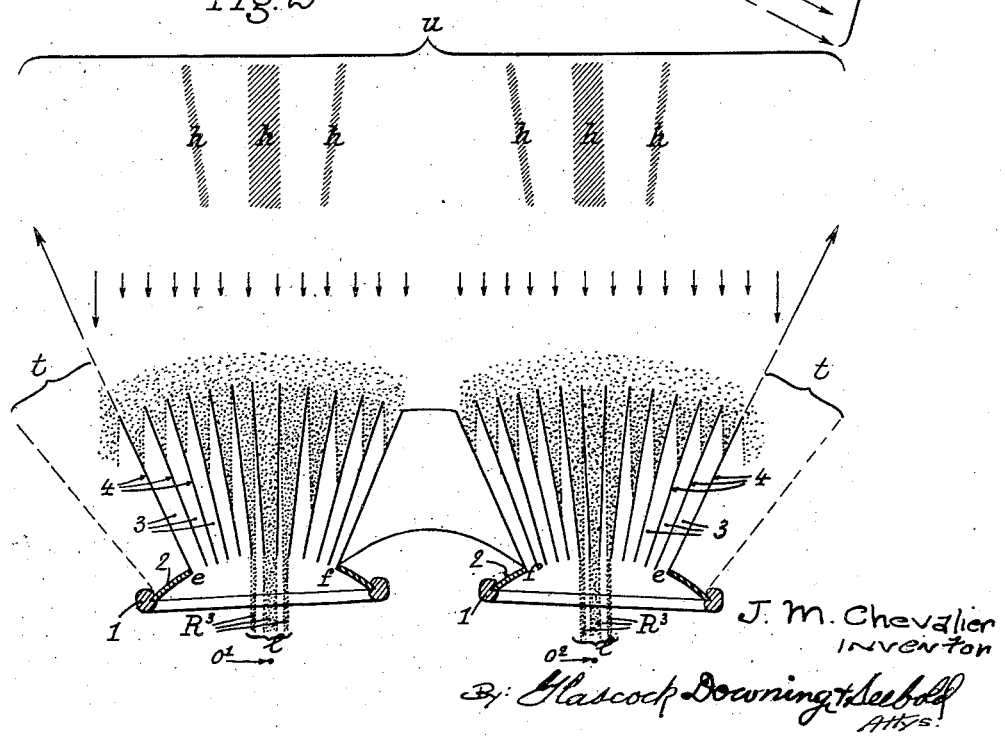
Fig. 2 is a horizontal section showing the distribution of the blinding regions in the horizontal direction, when the blinding rays are directed in line with the protecting cells.

In the embodiment represented in Figs. 1 and 2, the device comprises, for each eye $O^1$—$O^2$ (Fig. 2), represented by its optical centre, a frame $I$ in which is mounted a glass $2$ or like transparent support. It is to be noted that for a normal eyesight, the two faces of the glass are parallel, and the glass may have the form of a spherical cap whose centre coincides with $O^1$ or $O^2$, or is near $O^1$ or $O^2$.

In the case of abnormal eyesight, the glass $2$ may have any known corrective form which is adapted to restore the normal vision.

The upper part $ab$ (Fig. 1) of the glass is coloured in blue, yellow, green, etc., so that in the angle $x$ (Fig. 1) the vision will be attenuated, and that on the other hand the blinding rays $R^1$ falling upon this part $ab$ will be modified by the wall $2$ and will not irritate the retina.

From $b$ to $c$ (Fig. 1) and according to a more or less great horizontal arc $ef$ (Fig. 2), the glass $2$ carries on its front face a set of cells $3$ having the form of truncated pyramids, and their opaque walls $4$ converge, or at least approximately, to the centre $O^1$ or $O^2$ of the corresponding eye. The walls $4$ are opaque, and are as thin as possible. The small base, situated next the eye, and the large base, at the other end, allow the rays of light to pass freely. The small base can be closed off mechanically by the glass 2 or may be left free, the glass 2 being cut out adjacent the cells. The large base can be left free, but a glass piece or other transparent wall may be placed at the end of the cells in order to prevent all circulation of air and all deposit of dust in the cells, and if necessary, to attenuate the vision by a suitable colour. The cross-section of each cell may be hexagonal, triangular, rectangular, etc.

The open part of each cell, or the empty space left for the vision, may have a variable section which is large if a slight protection is desired, or is small, in the case of a more complete protection.

The individual form of each cell may be quite variable, in order to obtain, in addition to the useful effect, a decorative effect or a more economical construction.

Below the cells 3, from $d$ to $c$ (Fig. 1) the glass 2 may be eliminated (aperture 5) or may be preserved, but in this case it is colourless in this preserved part, thus affording the vision, complete and entirely free, in the angle $z$ (Fig. 1).

An examination of Figs. 1 and 2 clearly shows that the observer can see clearly through the spaces of the cells 3, in the angles $y$ (Fig. 1) and $u$ (Fig. 2). The walls 4 of each cell do not form a screen in front of the eye, but they only form imperceptible lines which will not practically stop the view.

On the other hand, the convergent surfaces 4 which form the said walls of the cells, constitute manifold opaque screens which prevent the passage of the practically parallel rays issuing from a blinding source of light, such as the sun, a brilliant headlight, etc.

If the blinding rays are oblique to the direction of vision, for instance at $R^2$ (Fig. 1), the pupil of the eye will remain in the shadow of the blinding light, as it is protected by the walls of the cells which intercept, at $mn$, $pq$, $rs$, the whole of such blinding rays.

If the blinding rays should arrive in the direction (or very nearly) in which the person is looking, as is the case for Fig. 2, for instance, a very small part $l$ (Fig. 2) of the surface of the eye near the pupil will receive these rays, but the rest of the eyeball will remain in darkness, due to the opaque walls of the cells.

Due to the stopping of the greater part of the blinding rays, the sensitive retina will only be subject to a short and slight prejudice. The hatched parts $h$ (Fig. 2) indicate the regions which are partly affected by the blinding rays which pass through the cells and fall upon the eye at $l$, but at once, and by habit, the vision becomes normal, even if the eye remains fixed in the direction of the blinding source of light.

The slight bad effect of the blinding rays $R^3$ (Fig. 2) may also be eliminated by a small movement of the eye, or of the direction of the groups of cells, in order to bring the blinding rays into the oblique position $R^2$ (Fig. 1), and either of these operations can be effected, with a certain habit, in a rapid manner and by a reflex action.

It should be noted that the vision is attenuated laterally in the angles $t$ (Fig. 2) by the lateral coloured parts of the glasses 2.

Figs. 3 to 5 represent an embodiment in which the glasses 2 are mounted in a known goggle frame 1.

In the modification shown in Fig. 6, the frame 1 and the glasses 2 are limited at their upper parts.

Fig. 7 is a perspective view of the same device as is shown in Figs. 3 to 5, but without a goggle frame and comprising hooks 7 for securing the device and elastic bands 8 providing for a rapid and effective securing of the device to a goggle frame 1 which is already fitted with corrective glasses.

The device is further provided with reinforcing members 6, which serve to increase the maintenance or the rigidity of the cells. The embodiments shown in Figs. 3 to 6 might be provided with similar reinforcing members.

Obviously, the invention is not limited to the forms of construction herein described and represented, which are given solely by way of example.

Having now described my invention what I claim as new and desire to secure by Letters Patent is:

1. An anti-blinding device comprising for each eye a number of juxtaposed tubular elements having opaque walls converging substantially towards the eye, and supporting means adapted to be attached to the head of the user and to support said tubular elements.

2. An anti-blinding device comprising for each eye a number of juxtaposed tubular elements having the form of truncated pyramids, the opaque walls of which converge substantially towards the eye, and supporting means adapted to be attached to the head of the user and to support said tubular elements.

3. An anti-blinding device comprising for each eye a number of juxtaposed tubular elements having opaque walls converging substantially towards the eye, and a goggle frame adapted to be attached to the head of the user and to support said tubular elements.

JULES MARCEL CHEVALIER.